United States Patent [19]

Fujimoto

[11] Patent Number: 5,551,629
[45] Date of Patent: Sep. 3, 1996

[54] GRANULAR SUBSTANCE STORING AND DISPENSING CONTAINER

[75] Inventor: Kanna Fujimoto, Tarumi-ku, Japan

[73] Assignee: The Procter & Gamble Company, Cincinnati, Ohio

[21] Appl. No.: 351,984

[22] Filed: Dec. 8, 1994

[30] Foreign Application Priority Data

Dec. 10, 1993 [JP] Japan ................................. 5-310666

[51] Int. Cl.⁶ ............................................... B65D 43/00
[52] U.S. Cl. ............................. 229/125.15; 229/125.17
[58] Field of Search ....................... 229/125.08, 125.09, 229/125.15, 125.17, 125.19, 125.28, 125.03

[56] References Cited

U.S. PATENT DOCUMENTS

| | | | |
|---|---|---|---|
| 2,820,491 | 1/1958 | Kromsten | 141/381 |
| 2,887,256 | 5/1959 | Thornhill | 222/527 |
| 3,265,282 | 8/1966 | Maxwell | 229/125.08 |
| 3,335,924 | 8/1967 | Miller | 229/125.08 X |
| 3,567,102 | 3/1971 | Miller | 229/122 X |
| 3,695,504 | 10/1972 | Simpson | 229/7 |
| 3,900,155 | 8/1975 | Rausing et al. | 229/125.09 |
| 4,249,693 | 2/1981 | Diaz | 229/43 |
| 4,421,236 | 12/1983 | Lowe | 206/621 |
| 4,693,414 | 9/1987 | Allen | 229/125.19 X |
| 5,115,966 | 5/1992 | McKibben et al. | 229/125.03 |
| 5,135,159 | 8/1992 | Giblin et al. | 229/125.09 X |
| 5,368,162 | 11/1994 | Holmgren | 206/387 |

FOREIGN PATENT DOCUMENTS

3518693A1   5/1985   Germany .
590929   4/1959   Italy .................................. 229/125.09

Primary Examiner—Allan N. Shoap
Assistant Examiner—Christopher J. McDonald
Attorney, Agent, or Firm—Ronald W. Kock

[57] ABSTRACT

A granular substance storing and dispensing container is disclosed, that comprises:

(i) a nearly rectangular parallelepiped carton being adapted for storing and dispensing a granular substance and having a front panel, a rear panel, a pair of side panels, an upper panel, a lower panel, and at least one opening portion, the front panel and the rear panel being disposed in opposed relation, the side panels being disposed in opposed relation, the upper panel and the lower panel being disposed in opposed relation, the at least one opening portion being disposed at least at one of four corners defined by the upper panel, the front panel, the rear panel, and the side panels; and (ii) a detachable lid adapted for measuring a predetermined amount of the granular substance and having, (a) at least three panels being connected to each other with is substantially right angle and adapted for forming a cup-shaped container with a vertex; and (b) at least one hermetically resealable device disposed on at least one of the three panels, the hermetically resealable device extending to a space of the cup-shaped container, wherein the lid is adapted to cover the opening portion and the resealable device is adapted to fix the lid to the carton when the lid is attached to the carton so that the vertex of the lid fits to the opening portion of the carton.

3 Claims, 17 Drawing Sheets

100
GRANULAR SUBSTANCE STORING AND DISPENSING CONTAINER

BACKGROUND OF THE INVENTION

1. Field of the Invention

The present invention relates to a hermetically-sealable granular substance storing and dispensing container for storing and dispensing a granular substance such as granular detergent.

In particular, the present invention relates to a hermetically-sealable granular substance storing and dispensing container comprising a carton and a hermetically resealable cup-shaped lid for measuring a predetermined amount of a granular substance so as to easily dispense the granular substance from the carton, measure the predetermined amount of the granular substance, and then hermetically reseal the container.

2. Description of the Related Art

Granular substance storing and dispensing containers with a cup-shaped lid have been disclosed in for example specifications of U.S. Pat. Nos. 2,820,491, 4,249,693, and 5,115,966.

However, unlike with the present invention, the containers disclosed in such related art references do not use four corners defined by an upper panel, a front panel, a rear panel, and a pair of side panels for forming an opening portion. In addition, the related art references should be improved so that a dispensing amount and a dispensing direction can be easily adjusted.

SUMMARY OF THE INVENTION

An object of the present invention is to provide a granular substance storing and dispensing container comprising an opening portion disposed at least at one of four corners and a cup-shaped lid so that the user can easily adjust a dispensing amount and a dispensing direction of a small amount of a granular substance such as detergent, completely dispense the contents stored in the carton, easily return the contents excessively dispensed in the lid to the carton, and easily measure a predetermined amount of the contents.

The present invention is a granular substance storing and dispensing container, comprising (i) a nearly rectangular parallelopiped carton being adapted for storing and dispensing a granular substance and having a front panel, a rear panel, a pair of side panels, an upper panel, a lower panel, and at least one opening portion, the front panel and the rear panel being disposed in opposed relation, the side panels being disposed in opposed relation, the upper panel and the lower panel being disposed in opposed relation, the at least one opening portion being disposed at least at one of four corners defined by the upper panel, the front panel, the rear panel, and the side panels; and (ii) a detachable lid adapted for measuring a predetermined amount of the granular substance and having, (a) at least three panels being connected to each other with substantially right angle and adapted for forming a cup-shaped container with a vertex; and (b) at least one hermetically resealable device disposed on at least one of the three panels, the hermetically resealable device extending to a space of the cup-shaped container, wherein the lid is adapted to cover the opening portion and the resealable device is adapted to fix the lid to the carton when the lid is attached to the carton so that the vertex of the lid fits to the opening portion of the carton.

As described above, according to the present invention, since the opening portion of the carton is formed at a corner defined by the upper panel, the front panel, the rear panel, and the side panels, a dispensing amount and a dispensing direction of a small amount of a granular substance such as detergent can be easily adjusted. Thus, a predetermined amount of the contents to be dispensed can be easily and precisely measured. In addition, the contents (granular substance) can be completely dispensed. In addition, since the panels of the lid are connected to each other with substantially right angle, when the lid is attached to the opening portion, the contents excessively dispensed into the lid can be easily returned to the carton.

The cup-shaped lid of the granular substance storing and dispensing container is detached from the carton. The contents (granular substance) stored in the carton is dispensed to the cup-shaped lid through the opening portion so as to measure the predetermined amount of the contents. After the contents are measured, the lid is attached to the carton and then the granular substance storing and dispensing container is hermetically sealed so as to store the contents therein.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, preferred embodiments of the present invention will be described.

FIGS. 1 to 5 show a granular substance storing and dispensing container according to an embodiment of the present invention.

Figure 1:
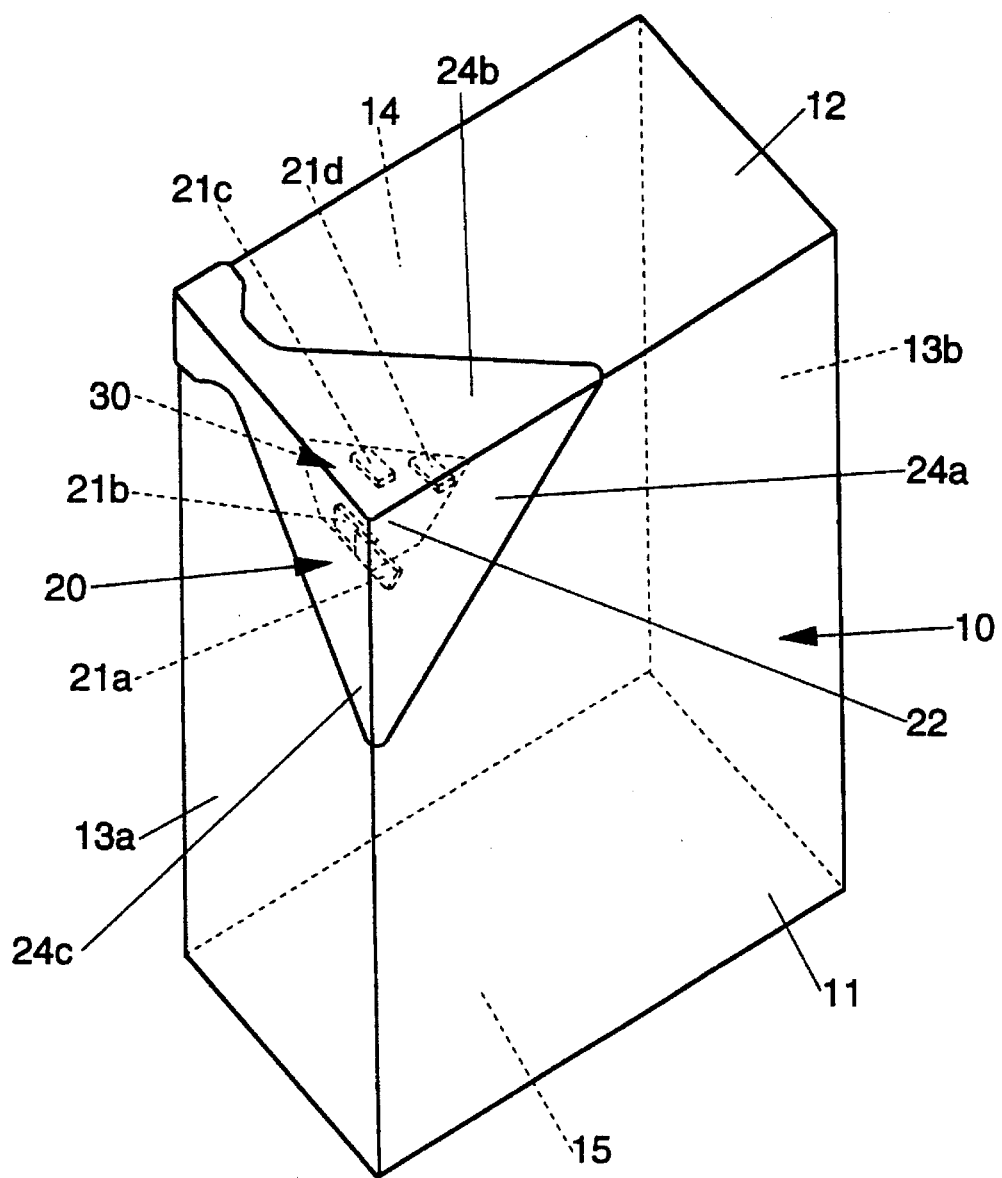
FIG. 1 is a perspective view showing a granular substance storing and dispensing container according to an embodiment of the present invention, the granular substance storing and dispensing container comprising a carton and a lid that is attached to the carton so as to hermetically seal the contents stored therein.
Figure 2:
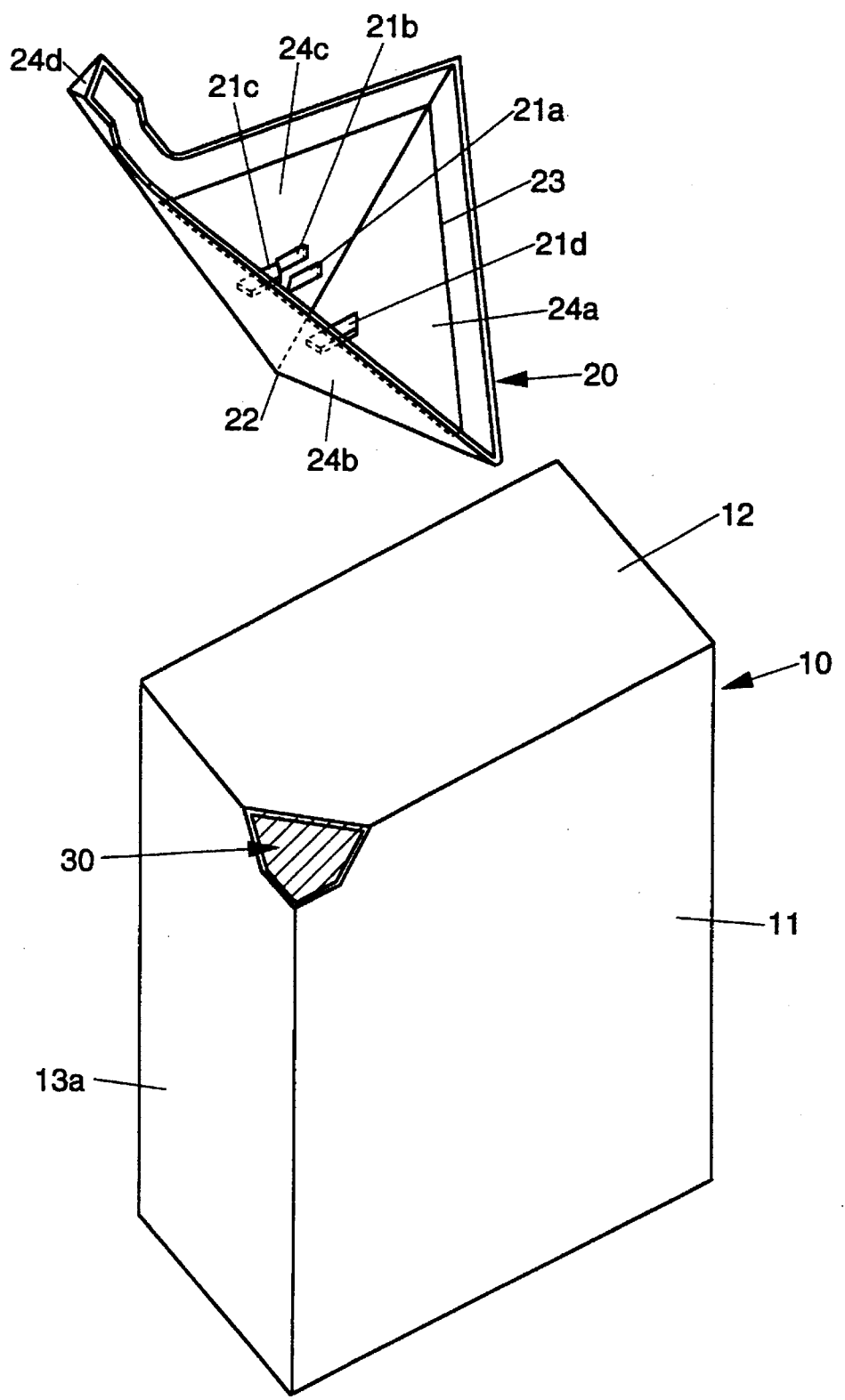
FIG. 2 is a perspective view showing the granular substance storing and dispensing container where the lid is detached from the carton of FIG. 1.
Figure 3:
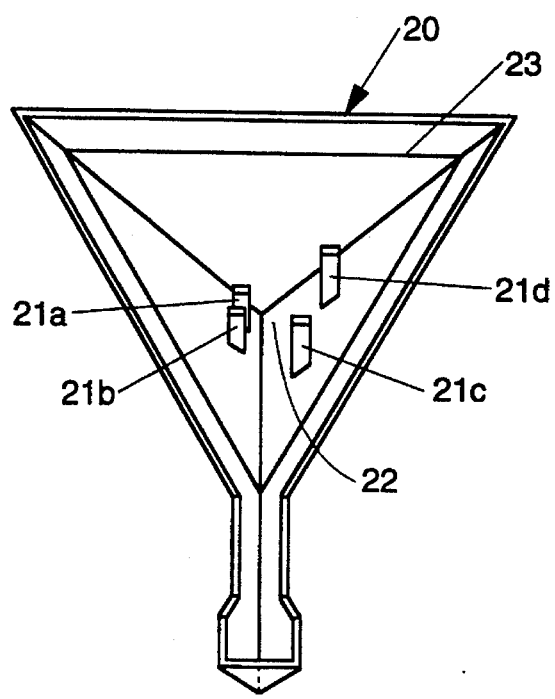
FIG. 3 is a perspective view showing the lid of FIG. 1, seen from a container space side.
Figure 4:
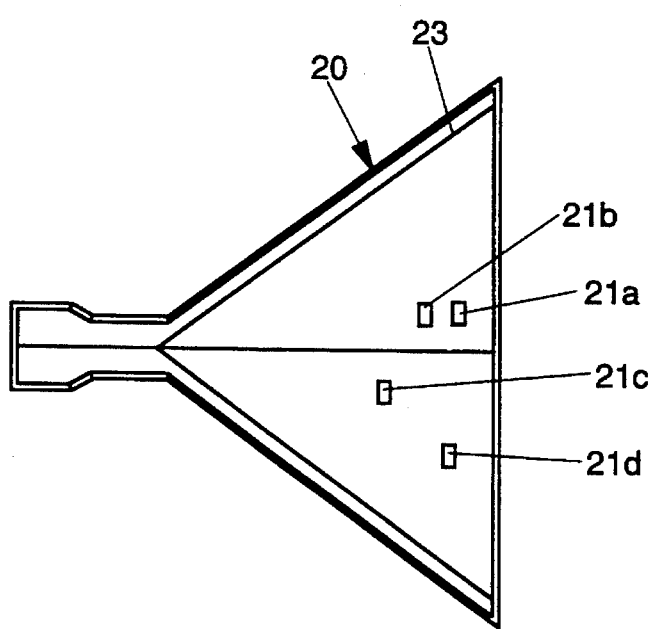
FIG. 4 is a plan view showing the lid of FIG. 1, seen from the container space side.
Figure 5:
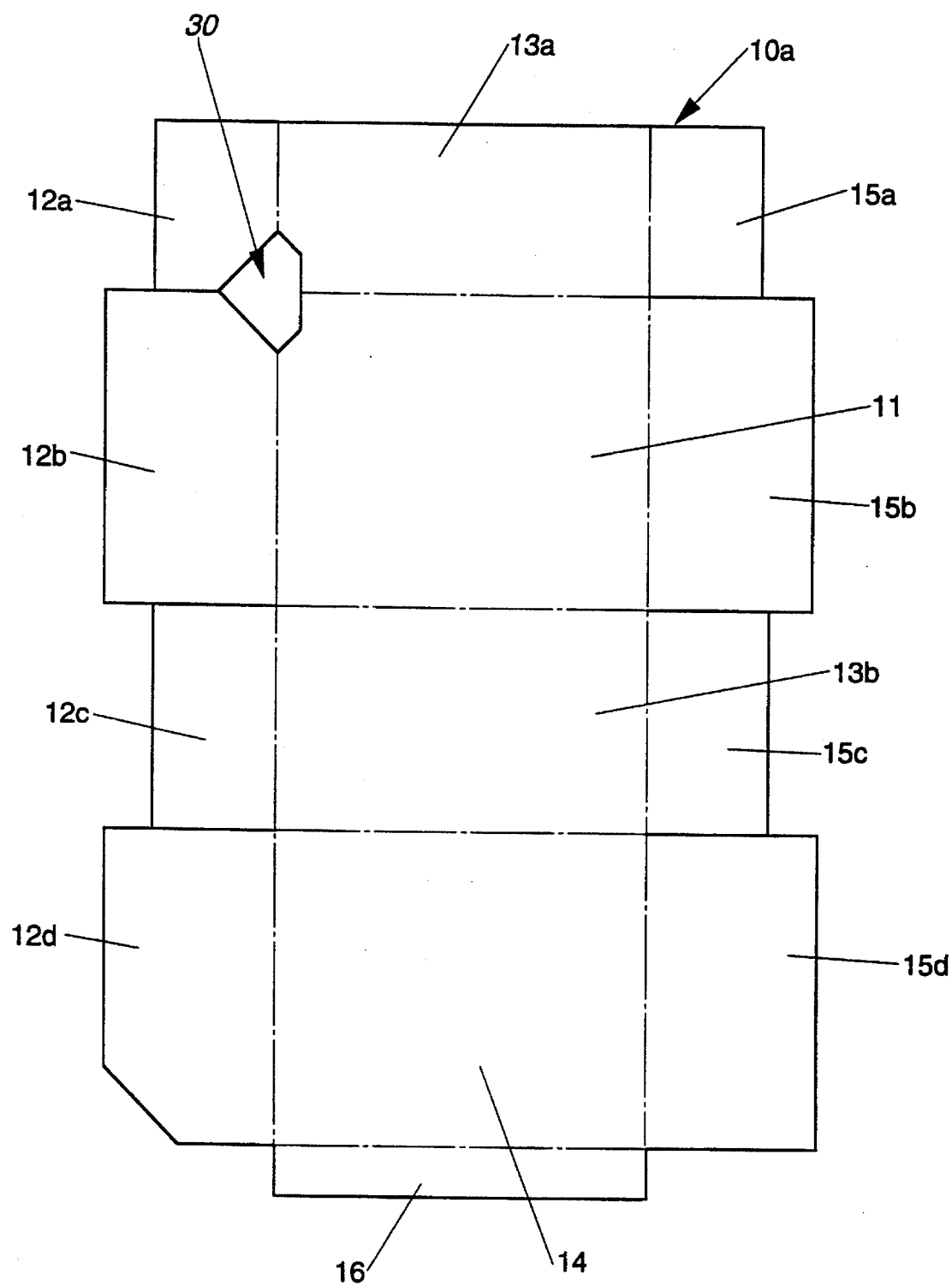
FIG. 5 is a development view (plan view of a carton original paper) of the carton of FIG. 1.

FIG. 1 shows a granular substance storing and dispensing container comprising a carton 10 and a lid 20 with a vertex 22 disposed at the bottom thereof. In FIG. 1, since the lid 20 is attached to the carton 10 so that the vertex 22 fits to an opening portion 30 of the carton 10, the granular substance storing and dispensing container is hermetically sealed. FIG. 2 shows the lid 20 and the carton 10 from which the lid 20 is detached. FIG. 3 is a perspective view showing the lid 20, seen from a container space side. FIG. 4 is a plan view showing the lid 20, seen from the container space side. FIG. 5 is a plan view showing a carton original paper that is used for fabricating the carton 10 (a development view of the carton 10). The carton 10 comprises a front panel 11, a rear panel 14, a pair of side panels 13a and 13b, an upper panel 12, and a lower panel 15. The opening portion 30 is disposed at one of four corners defined by the front panel 11, the rear panel 14, the pair of side panels 13a and 13b, and the upper panel 12. The lid 20 has a measuring line 23 with which a predetermined amount of the granular substance is measured. The lid 20 comprises four panels 24a, 24b, 24c, and 24d, each of which is connected to each other with substantially right angle. In addition, the lid 20 has a vertex 22. Thus, the lid 20 is a cup-shaped container. The lid 20 has pins 21c, 21d, 21a, and 21b that are hermetically resealable devices (namely, hermetically resealable fixing means) and extend to the container space. The pins 21c and 21d are disposed on the panel 24b. The pins 21a and 21b are disposed on the panel 24c. As shown in FIG. 1, when the lid 20 is attached to the carton 10, the lid 20 covers the opening portion 30 of the carton 10. At this point, the pins 21a, 21b, 21c, and 21d on the lid 20 partly come in contact with edges of the opening portion 30, thereby fixing the lid 20 to the carton 10.

As shown in FIG. 5, the carton 10 is preferably formed of a single carton original paper 10a. The carton original paper 10a is made of a cardboard with ruled lines (denoted by dashed lines) so that adjacent panels are bent and folded. Vertical ruled lines define boundaries of the panels 11, 13a, 13b, 14, and 16. An adhesive flap 16 is preferably adhered to the outside of the side panel 13a with a heat melting adhesive agent. Horizontal ruled lines define a boundary of the side panel 13a and a flap 12a, a boundary of the side panel 13a and a flap 15a, a boundary of the front panel 11 and a flap 12b, a boundary of the front panel 11 and a flap 15b, a boundary of the side panel 13b and a flap 12c, a boundary of the side panel 13b and a flap 15c, a boundary of the rear panel 14 and a flap 12d, and a boundary of the rear panel 14 and a flap 15d. The lower flaps 15a, 15b, 15c, and 15d are inwardly folded and fixed each other and thereby the lower panel 15 of the carton 10 is formed. The upper flaps 12a, 12b, 12c, and 12d are inwardly folded and fixed and thereby the upper panel 12 of the carton 10 is formed.

Figure 22:
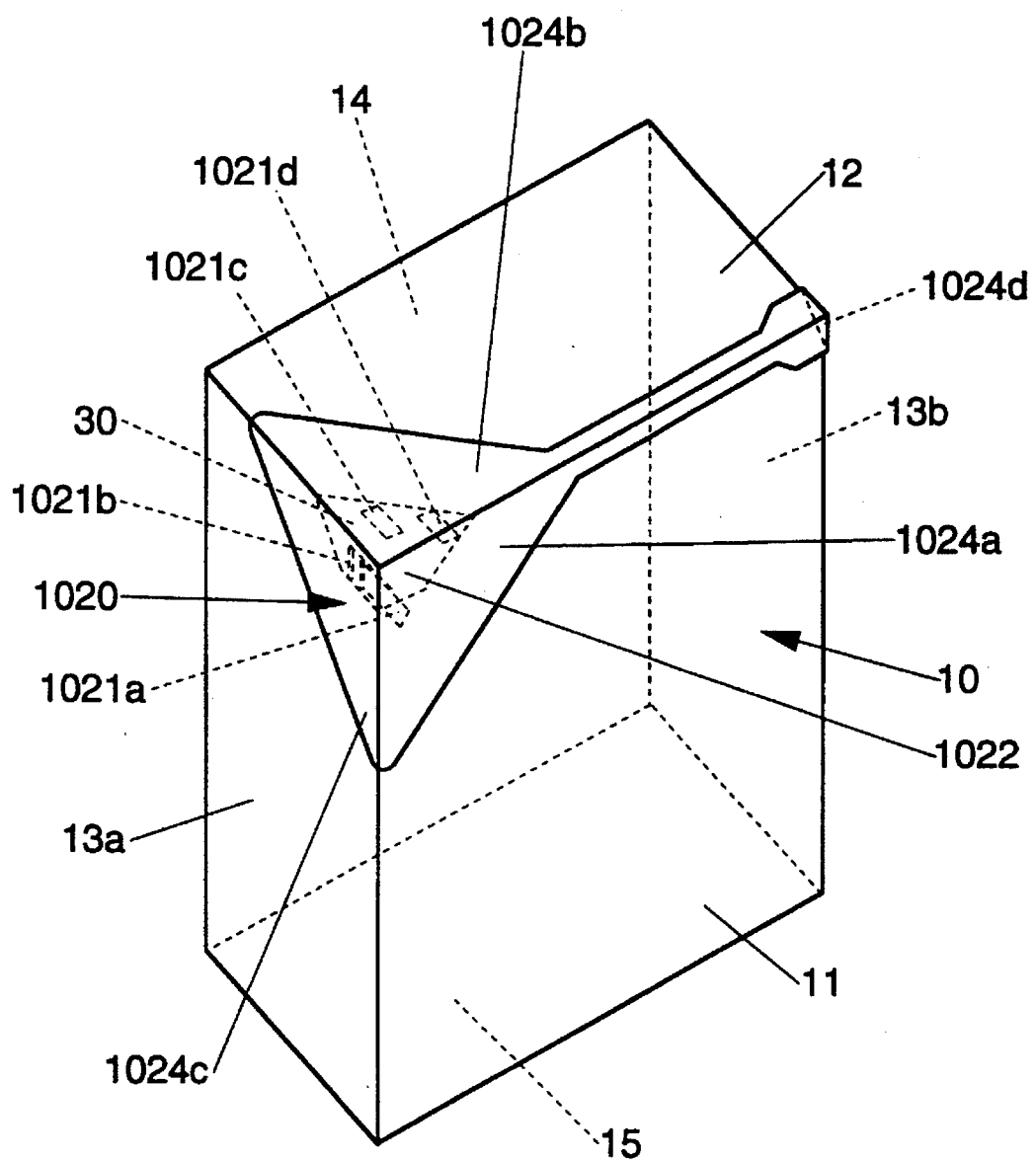
FIG. 22 is a perspective view showing a granular substance storing and dispensing container according to another embodiment of the present invention, the granular substance storing and dispensing container comprising a carton and a lid that is attached to the carton so as to hermetically seal the contents stored therein.
Figure 23:
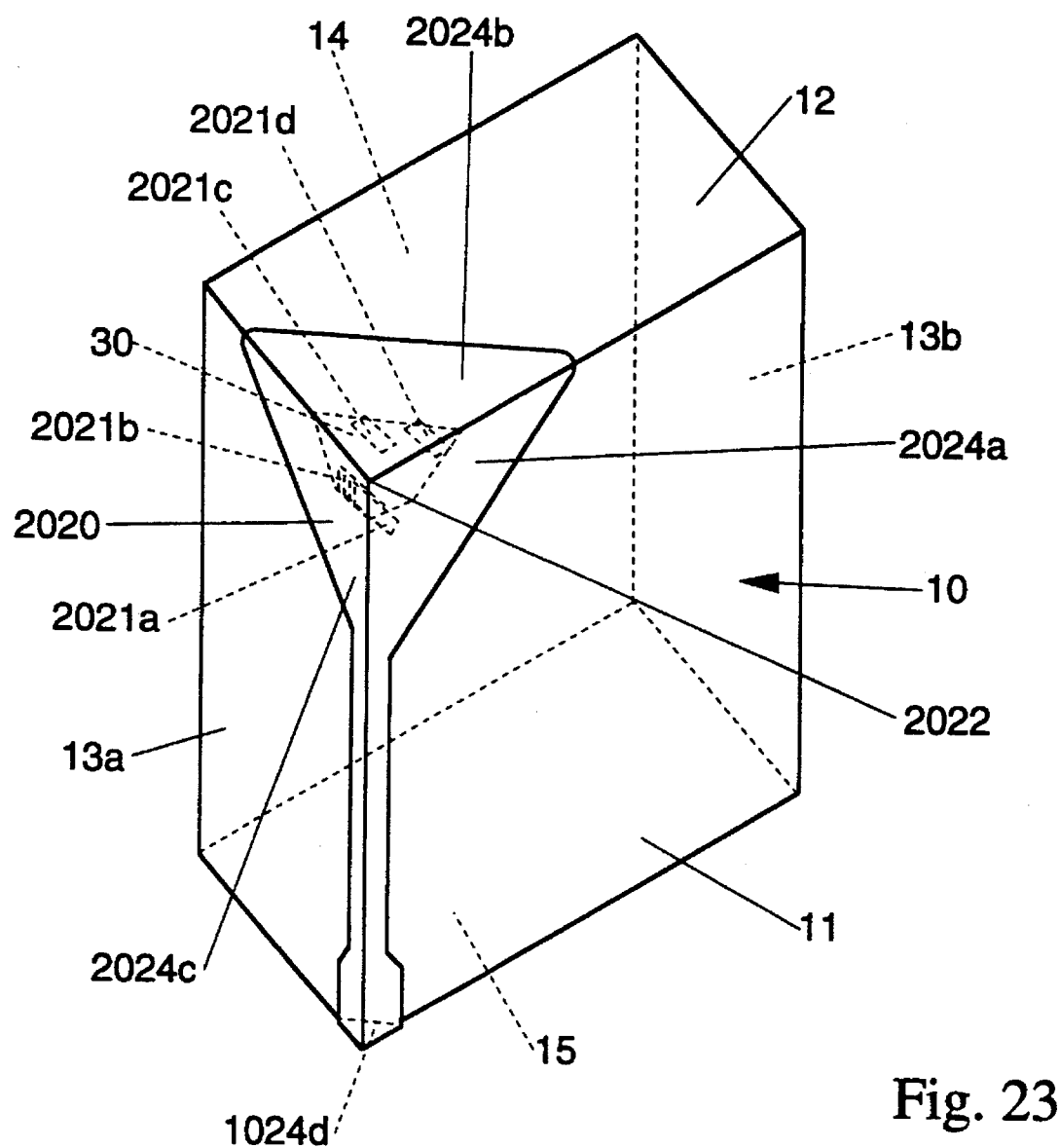
FIG. 23 is a perspective view showing a granular substance storing and dispensing container according to another embodiment of the present invention, the granular substance storing and dispensing container comprising a carton and a lid that is attached to the carton so as to hermetically seal the contents stored therein.

As shown in FIG. 1, when the lid 20 is attached to the carton 10, the lid 20 comes in contact with the front panel 11, the rear panel 14, the side panel 13a, and the upper panel 12. However, the lid 20 may be substituted with a lid 1020 (shown in FIG. 22) that comes in contact with the front panel 11, the side panels 13a and 13b, and the upper panel 12. In addition, the lid 20 may be substituted with a lid 2020 (shown in FIG. 23) that comes in contact with the front panel 11, the side panel 13a, the upper panel 12, and the lower panel 15. These lids 1020 and 2020 have the same effects as the lid 20 does.

Figure 6:
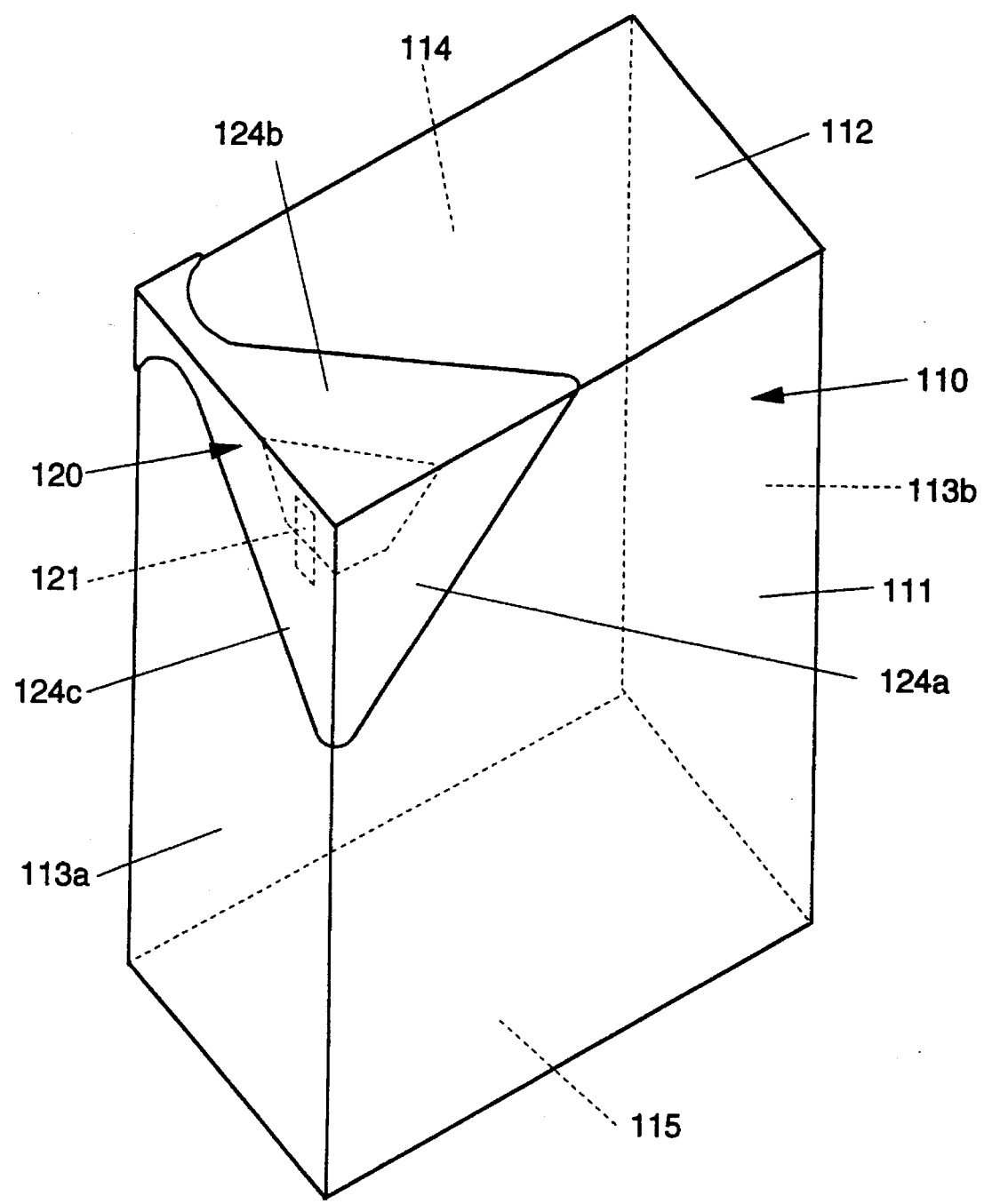
FIG. 6 is a perspective view showing a granular substance storing and dispensing container according to another embodiment of the present invention, the granular substance storing and dispensing container comprising a carton and a lid that is attached to the carton so as to hermetically seal the contents stored therein.
Figure 7:
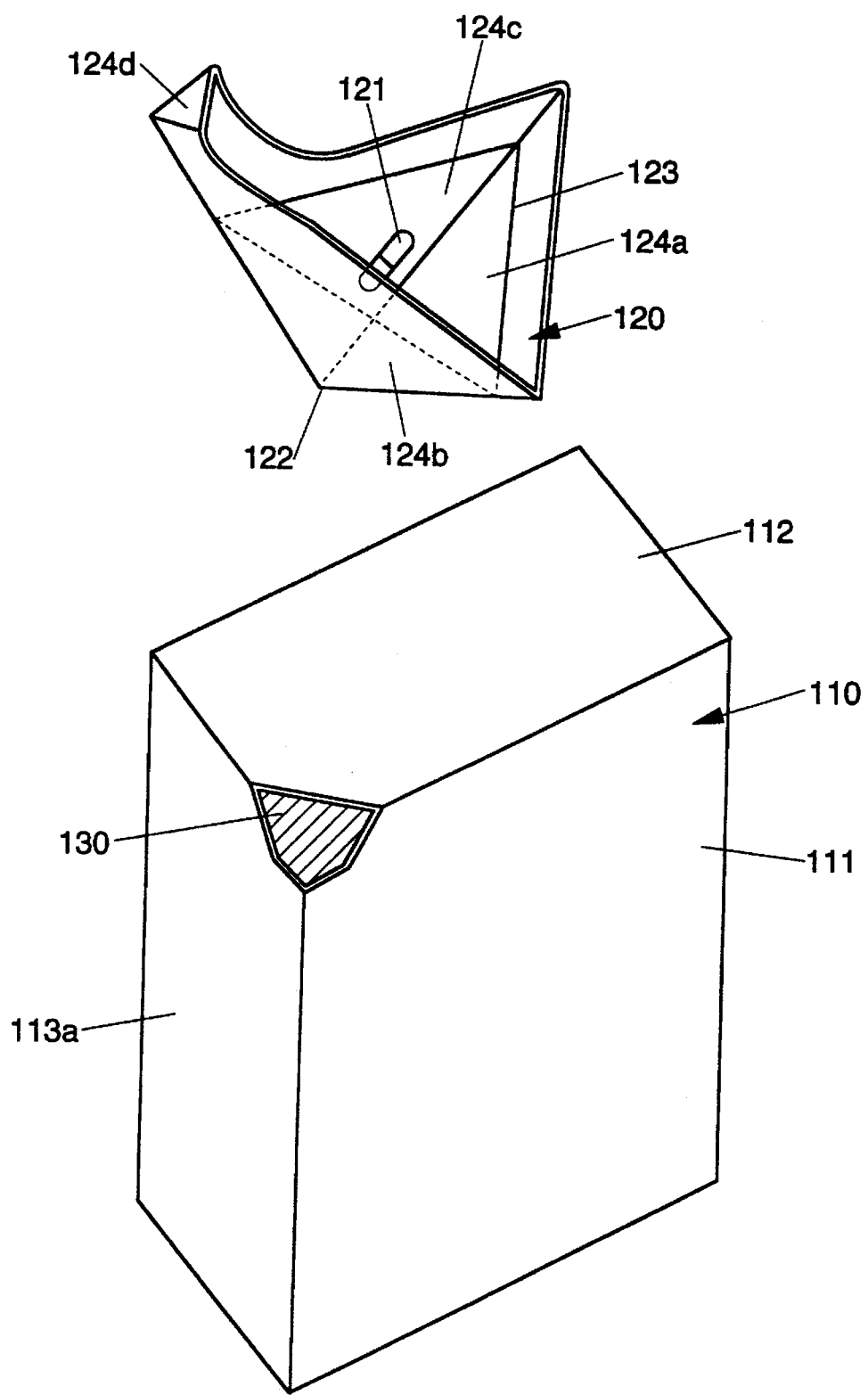
FIG. 7 is a perspective view showing the granular substance storing and dispensing container where the lid is detached from the carton of FIG. 6.

FIGS. 6 to 12 show a granular substance storing and dispensing container according to another embodiment of the present invention. In FIGS. 6 and 7, a carton 110 comprises a front panel 111, a rear panel 114, a pair of side panels 113a and 113b, an upper panel 112, and a lower panel 115. An opening portion 130 is disposed at one of four corners defined by the panels 111, 114, 113a, 113b, and 112.

A lid 120 has a measuring line 123. The lid 120 comprises four panels 124a, 124b, 124c, and 124d, each of which is connected to each other with substantially right angle. The lid 120 has a vertex 122. Thus, the lid 120 is a cup-shaped container. The lid 120 has a clip 121 that is disposed on the panel 124c and extends to the container space. The clip 121 is a hermetically resealable device.

As shown in FIG. 6, when the lid 120 is attached to the carton 110 so that the vertex 122 of the lid 120 fits to the opening portion 130 of the carton 110, the lid 120 covers the opening portion 130 of the carton 110. At this point, the clip 121 on the lid 120 partly comes in contact with an edge of a carton panel that defines the opening portion 130, thereby fixing the lid 120 to the carton 110.

Figure 8:
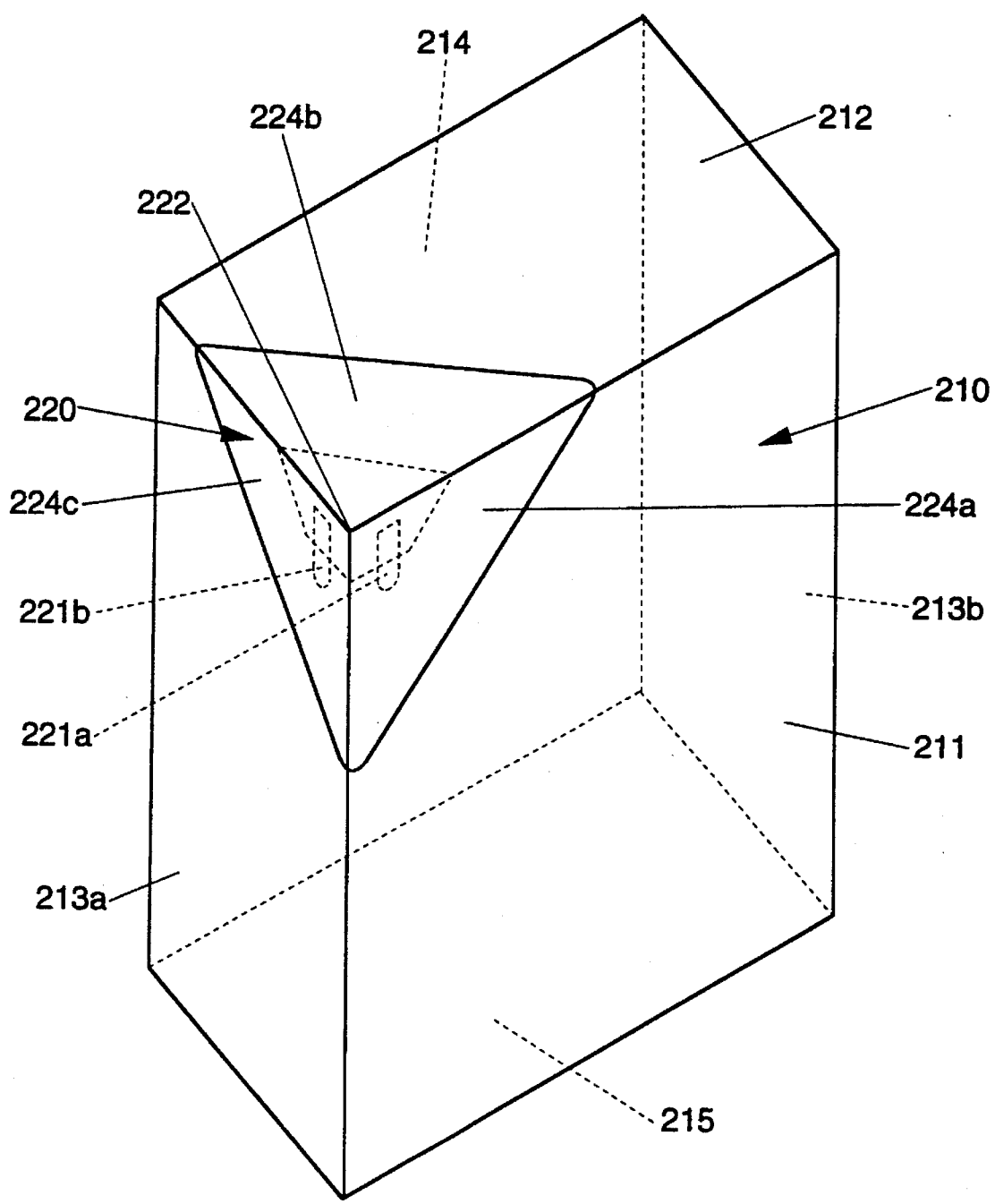
FIG. 8 is a perspective view showing a granular substance storing and dispensing container according to another embodiment of the present invention, the granular substance storing and dispensing container comprising a carton and a lid that is attached to the carton so as to hermetically seal the contents stored therein.
Figure 9:
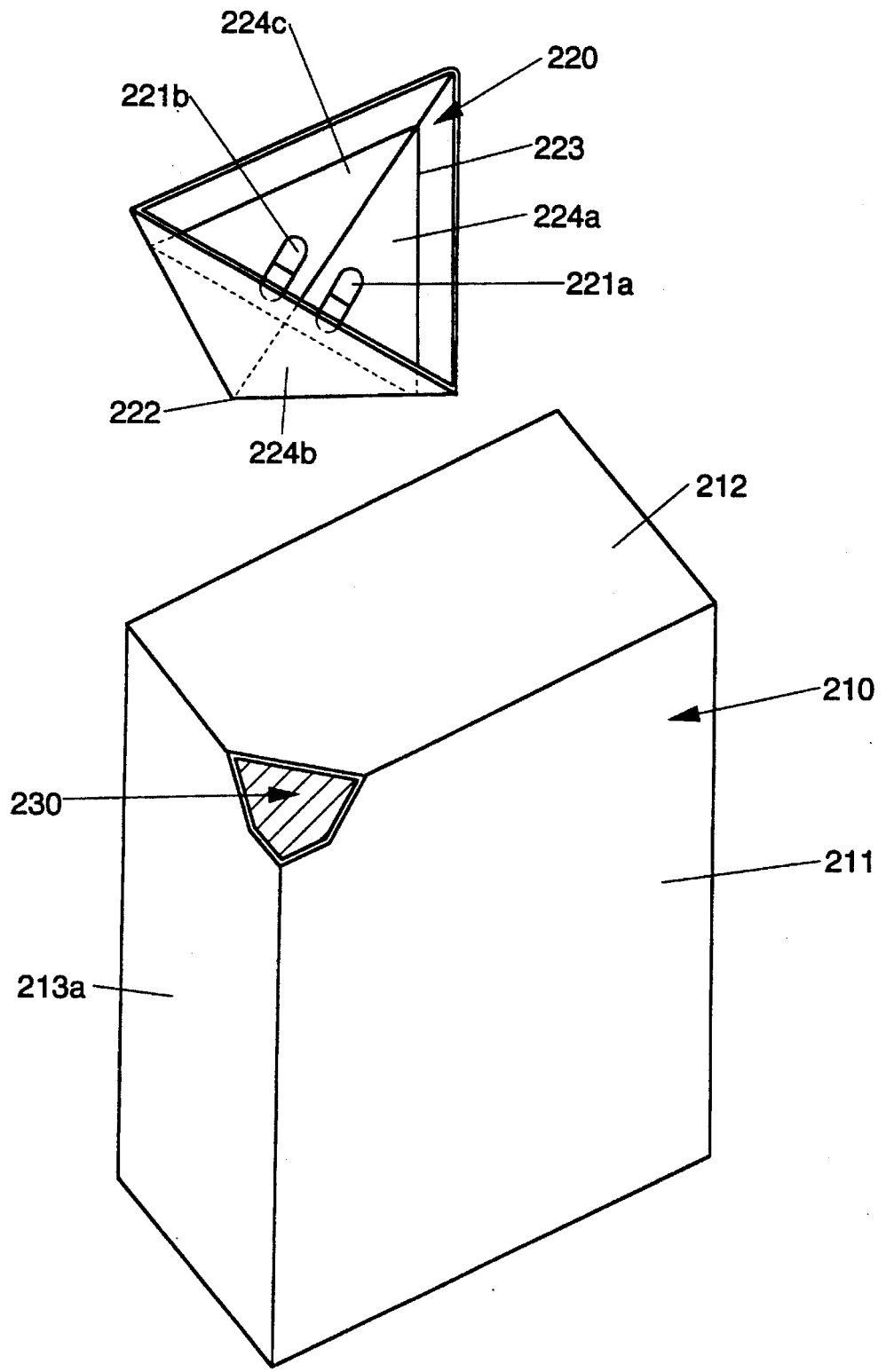
FIG. 9 is a perspective view showing the granular substance storing and dispensing container where the lid is detached from the carton of FIG. 8.

In FIGS. 8 and 9, a carton 210 comprises a front panel 211, a rear panel 214, a pair of side panels 213a and 213b, an upper panel 212, and a lower panel 215. An opening portion 230 is disposed at one of four corners defined by the panels 211, 214, 213a, 213b, and 212.

A lid 220 has a measuring line 223. The lid 220 comprises three panels 224a, 224b, and 224c, each of which is connected to each other with substantially right angle. The lid 222 has a vertex 222. Thus, the lid 222 is a cap-shaped container. The lid 222 has clips 221a and 221b that are disposed on the panels 224a and 224c, respectively. The clips 221a and 221b are hermetically resealable devices.

As shown in FIG. 8, when the lid 220 is attached to the carton 210 so that the vertex 222 of the lid 220 fits to the opening portion 230 of the carton 210, the lid 220 covers the opening portion 230 of the carton 210. At this point, the clips 221a and 221b on the lid 220 partly come in contact with edges of carton panels that define the opening portion 230, thereby fixing the lid 220 to the carton 210.

Figure 10:
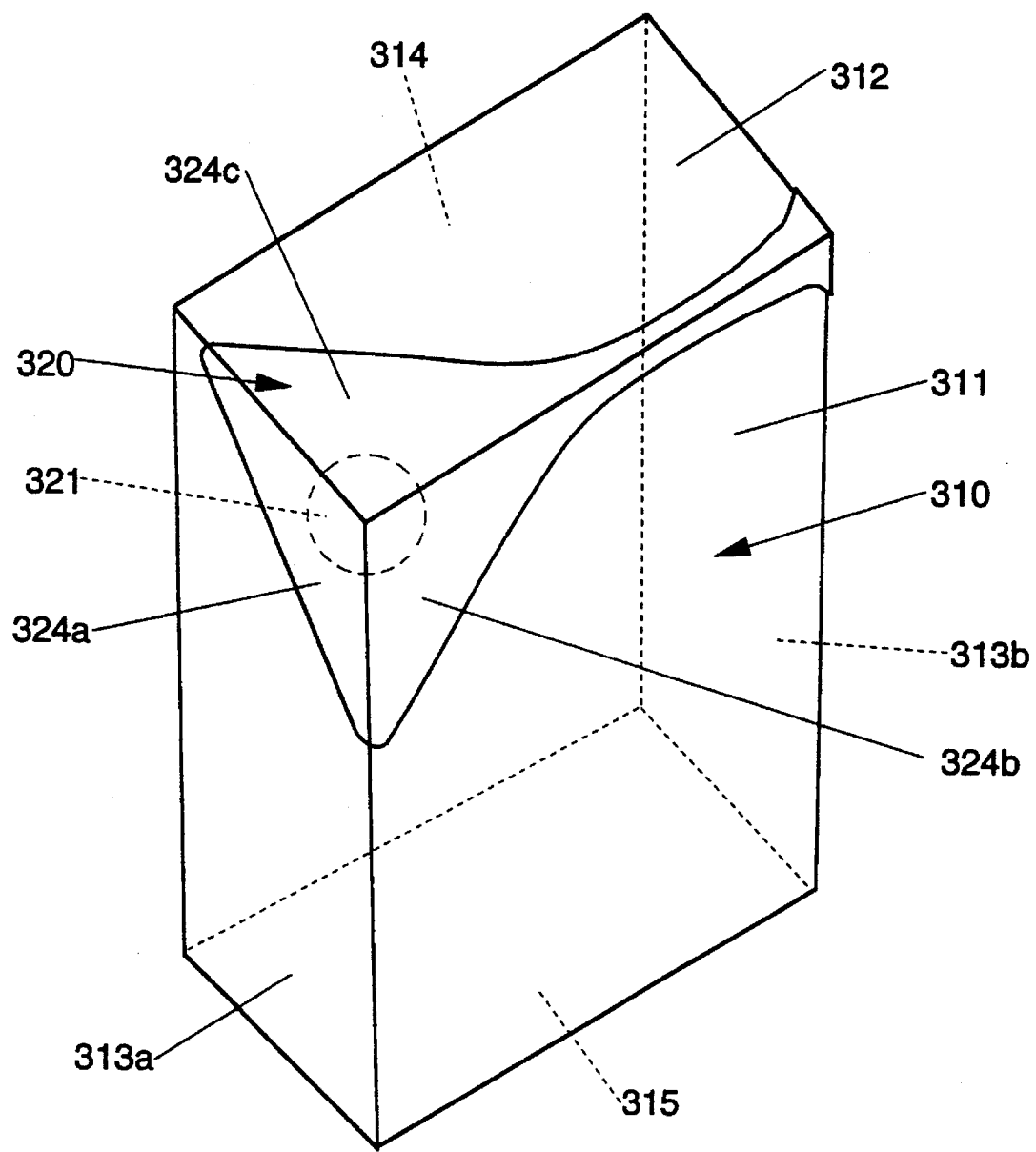
FIG. 10 is a perspective view showing a granular substance storing and dispensing container according to another embodiment of the present invention, is the granular substance storing and dispensing container comprising a carton and a lid that is attached to the carton so as to hermetically seal the contents stored therein.
Figure 11:
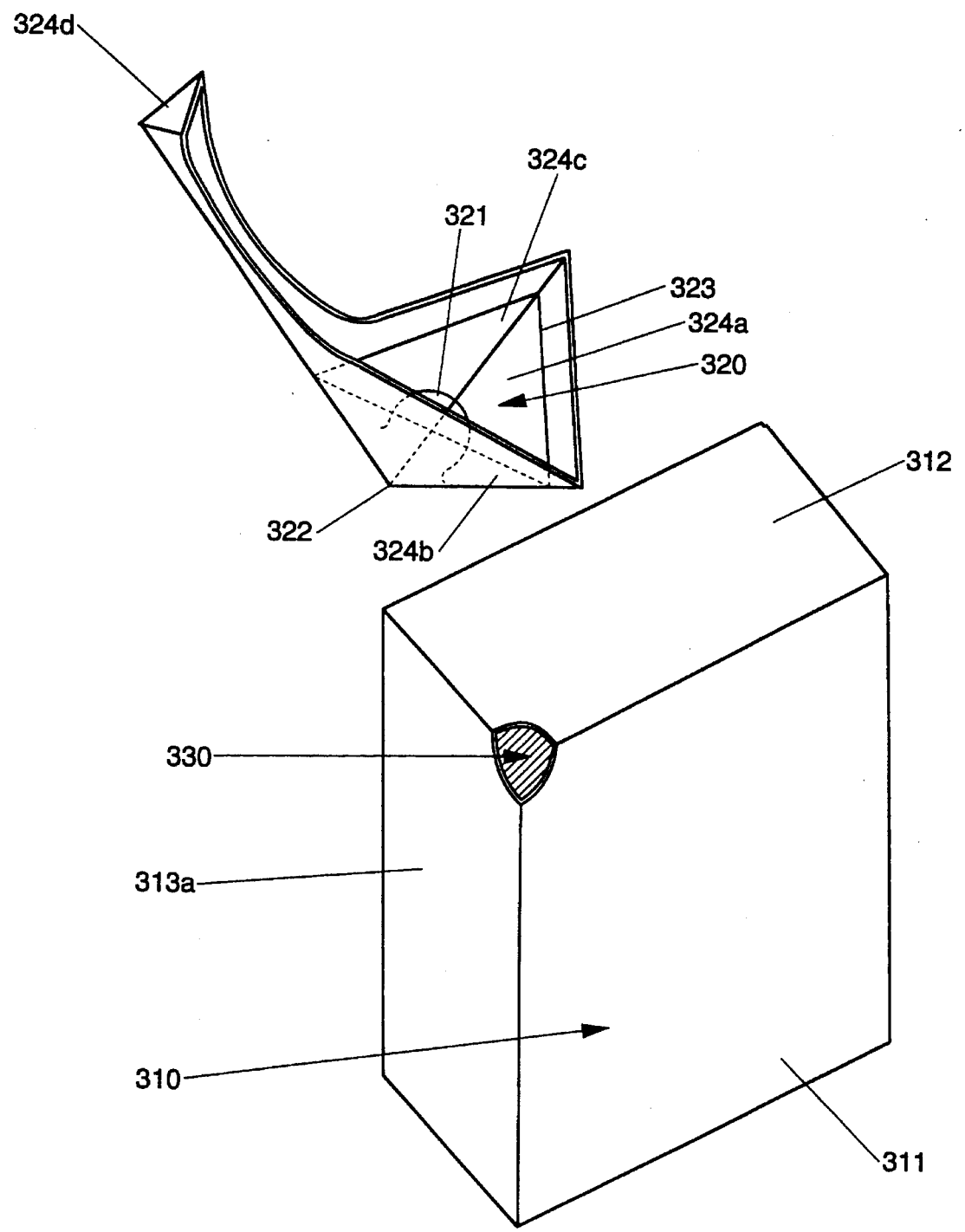
FIG. 11 is a perspective view showing the granular substance storing and dispensing container where the lid is detached from the carton of FIG. 10.

In FIGS. 10 and 11, a carton 310 comprises a front panel 311, a rear panel 314, a pair of side panels 313a and 313b, an upper panel 312, and a lower panel 315. An opening portion 330 is disposed at one off our corners defined by the panels 311, 314, 313a, 313b, and 312.

A lid 320 has a measuring line 323. The lid 320 comprises four panels 324a, 324b, 324c, and 324d, each of which is connected to each other with substantially right angle. The lid 320 has a vertex 322. Thus, the lid 320 is a cap-shaped container. The lid 320 has a plug 321 that extends to the container space. The plug 321 is a hermetically resealable device.

As shown in FIG. 10, when the lid 320 is attached to the carton 310 so that the vertex 322 of the lid 320 fits to the opening portion 330 of the carton 310, the lid 320 covers the opening portion 330 of the carton 310. At this point, the plug 320 on the lid 320 partly comes in contact with an edge of a carton panel that defines the opening portion 330, thereby fixing the lid 320 to the carton 310.

Figure 12:
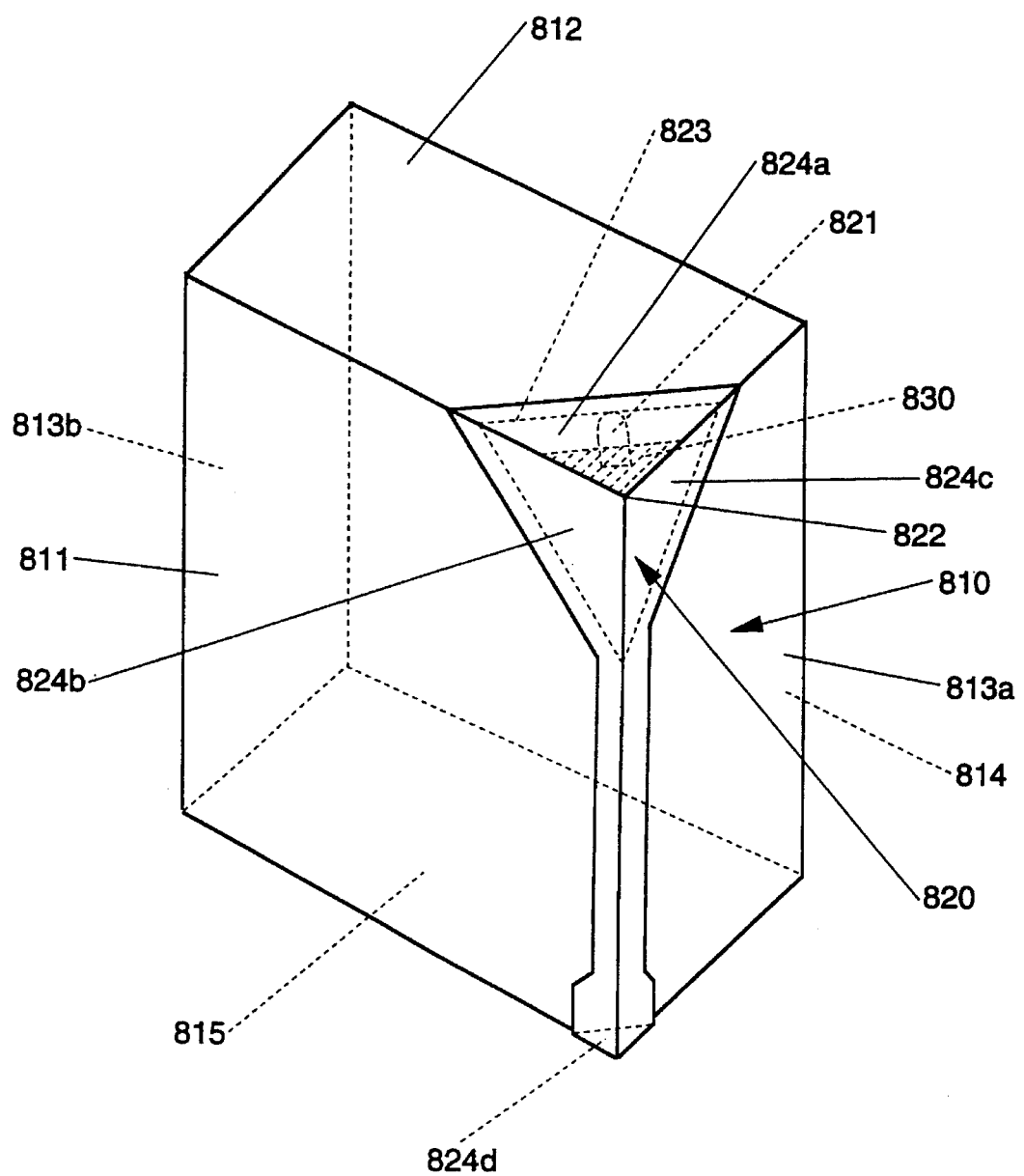
FIG. 12 is a perspective view showing a granular substance storing and dispensing container according to another embodiment of the present invention, the granular substance storing and dispensing container comprising a carton and a lid that is attached to the carton so as to hermetically seal the contents stored therein.

In FIG. 12, a carton 810 comprises a front panel 811, a rear panel 814, a pair of side panels 813a and 813b, an upper panel 812, and a lower panel 815. An opening portion 830 is disposed at one of four corners defined by the panels 811, 814, 813a, 813b, and 812.

A lid 820 has a measuring line 823. The lid 820 comprises four panels 824a, 824b, 824c, and 824d, each of which is connected to each other with substantially fight angle. The lid 320 has a vertex 822. Thus, the lid 820 is a cap-shaped container. The lid 820 has a clip 821 that extends to the container is space. The clip 821 is a hermetically resealable device.

As shown in FIG. 12, when the lid 820 is attached to the carton 810 so that the vertex 822 of the lid 820 fits to the opening portion 830 of the carton 810, the lid 820 covers the opening portion 830 of the carton 810. At this point, the plug 820 on the lid 820 partly comes in contact with an edge of a carton panel that defines the opening portion 830, thereby fixing the lid 820 to the carton 810.

Figure 13:
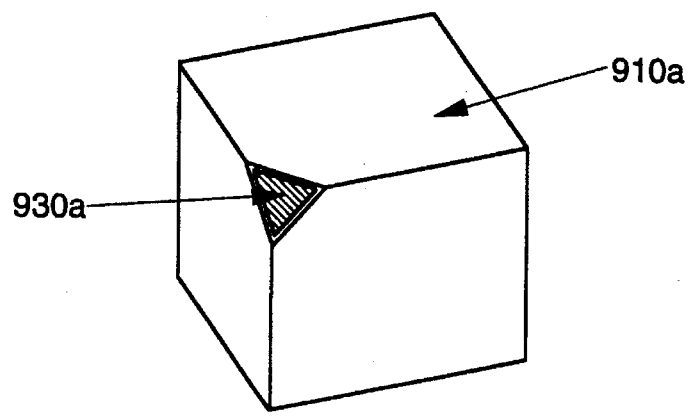
FIG. 13 is a perspective view showing a carton with another type of opening portion according to another embodiment of the present invention.
Figure 14:
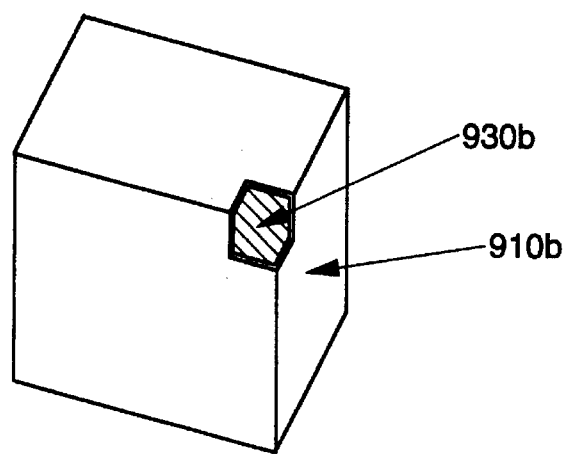
FIG. 14 is a perspective view showing a carton with another type of opening portion according to another embodiment of the present invention.
Figure 15:
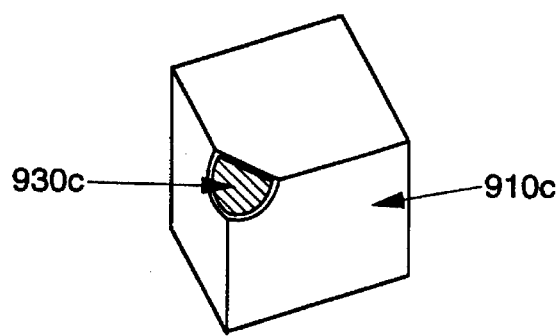
FIG. 15 is a perspective view showing a carton with another type of opening portion according to another embodiment of the present invention.

As another embodiment, the carton 110 having the opening portion 130 (shown in FIGS. 6 and 7) may be substituted with a carton 910a having an opening portion 930a (shown in FIG. 13). In addition, the carton 110 may be substituted with a carton 910b having an opening portion 930b (shown in FIG. 14). Moreover, the carton 110 may be substituted with a carton 910c having an opening portion 930c (shown in FIG. 15).

Figure 20:
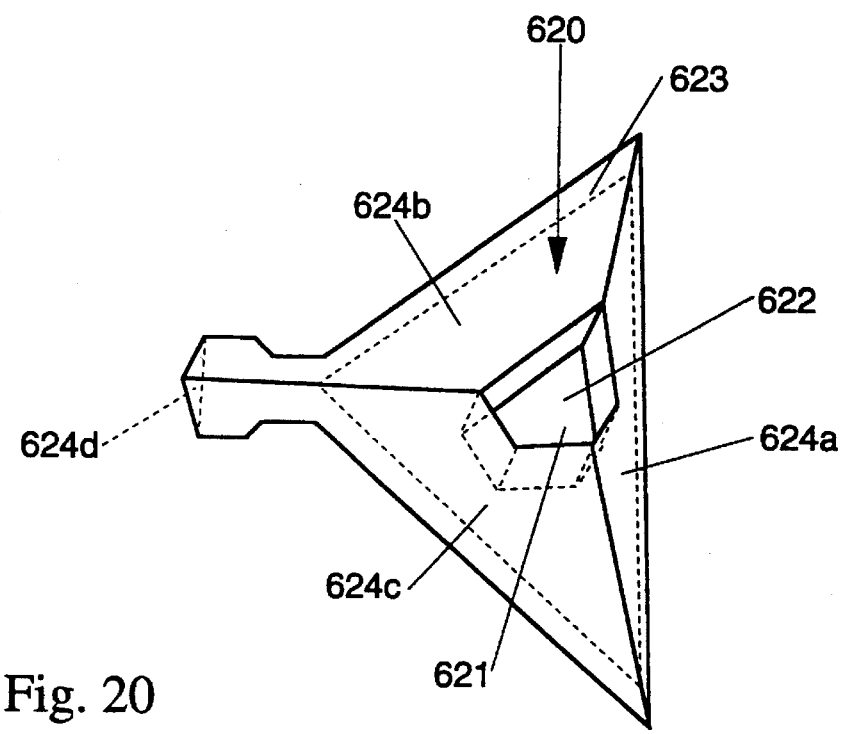
FIG. 20 is a perspective view showing a lid with another type of hermetically resealable device according to another embodiment of the present invention, seen from an anti-container space side.
Figure 21:
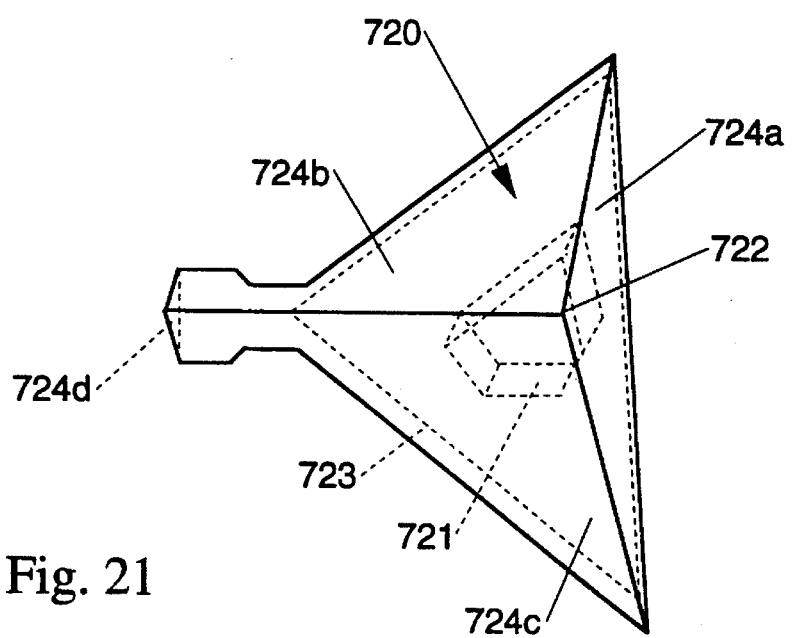
FIG. 21 is a perspective view showing a lid with another type of hermetically resealable device according to another embodiment of the present invention, seen from an anti-container space side.

As a further embodiment, the lid 20 (shown in FIGS. 1 and 2) may be substituted with a lid 420 (shown in FIGS. 16 and 17), a lid 520 (shown in FIGS. 18 and 19), a lid 620 (shown in FIG. 20), or a lid 720 (shown in FIG. 21).

Figure 16:
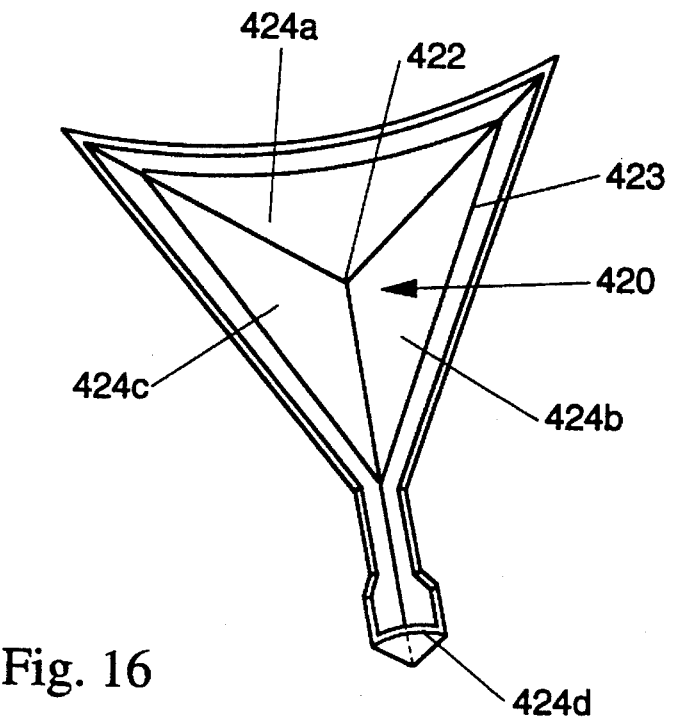
FIG. 16 is a perspective view showing a carton with another type of hermetically resealable device according to another embodiment of the present invention.
Figure 17:
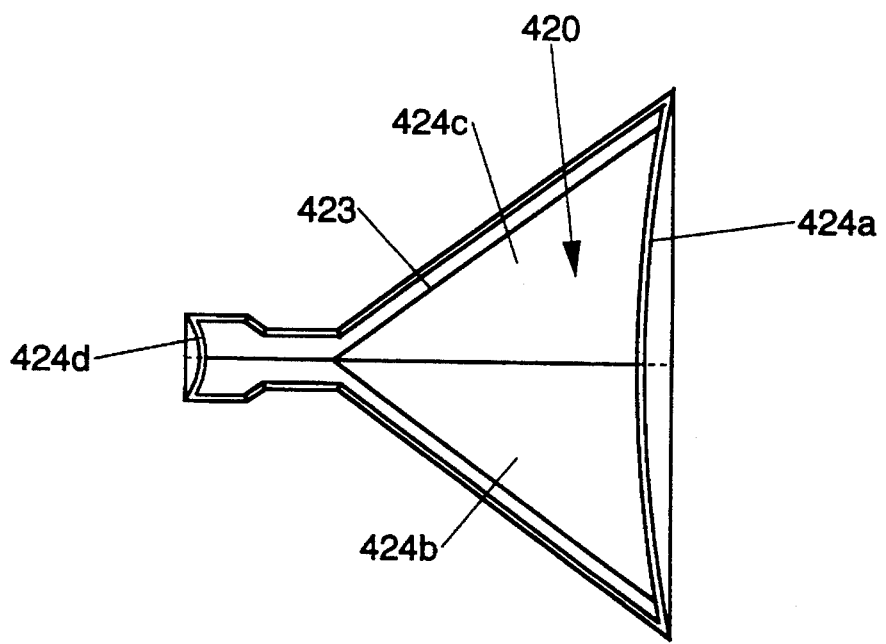
FIG. 17 is a plan view showing the lid of FIG. 16, seen from the container space side.

In FIGS. 16 and 17, the lid 420 has a measuring line 423. The lid 420 comprises four panels 424a, 424b, 424c, and 424d, each of which is connected to each other with substantially right angle. The lid 420 has a vertex 422. Thus, the lid 420 is a cup-shaped container. The panels 424a and 424d are curved on the container space side. As shown in FIG. 2, when the lid 420 is attached to the carton 10 so that the vertex 422 of the lid 420 fits to the opening portion 30 of the carton 10, the lid 420 covers the opening portion 30 of the carton 10. At this point, the curved panels 424a and 424d hold the front panel 11 and the rear panel 14 of the carton 10, thereby fixing the lid 420 to the carton 10.

Figure 18:
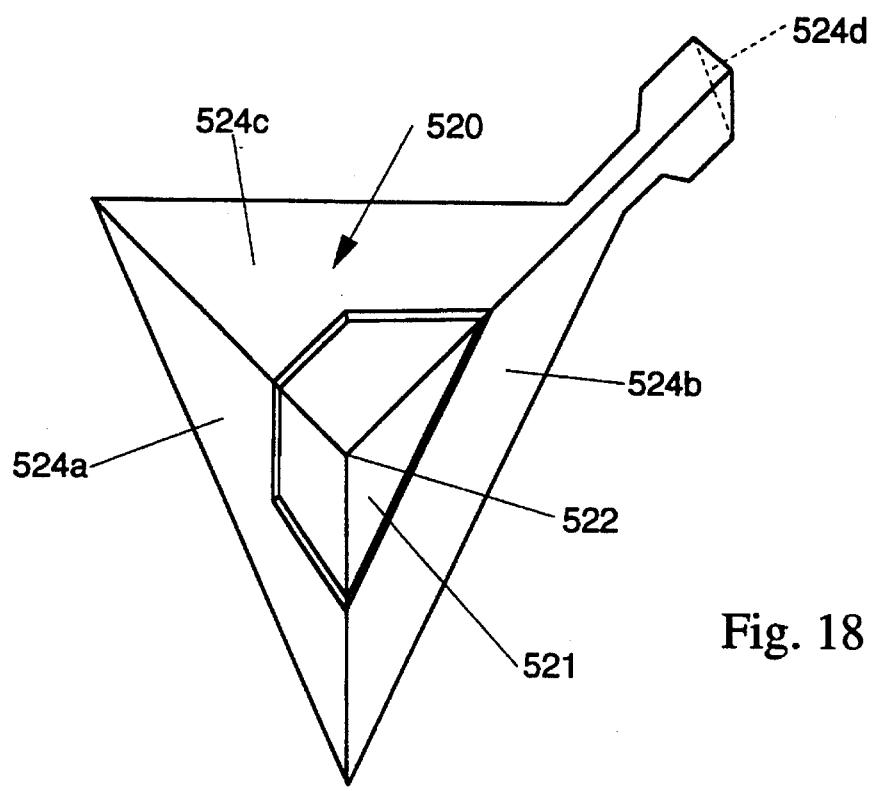
FIG. 18 is a perspective view showing a lid with another type of hermetically resealable device according to another embodiment of the present invention, seen from an anti-container space side.
Figure 19:
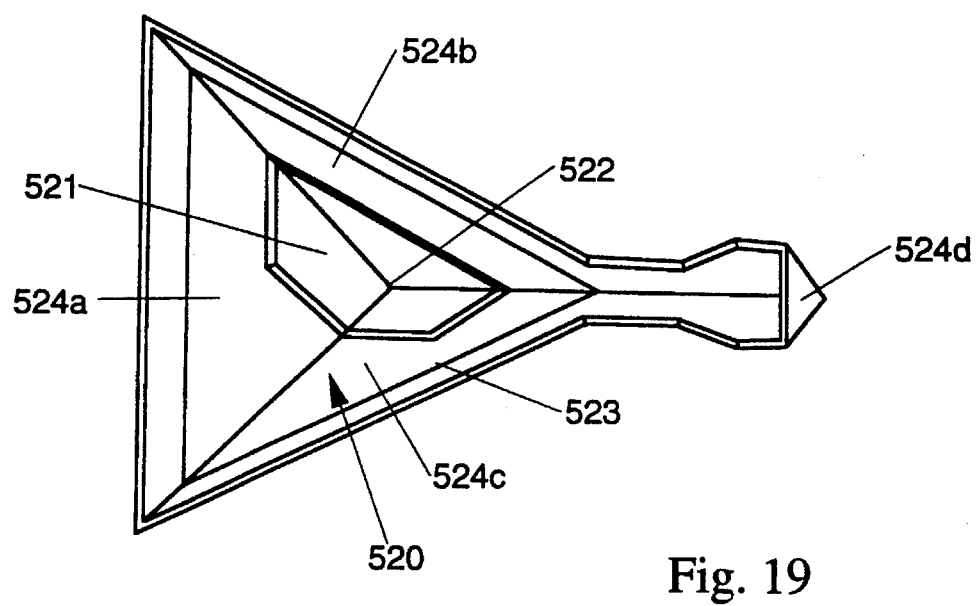
FIG. 19 is a perspective view showing the lid of FIG. 18, seen from the container space side.

In FIGS. 18 and 19, the lid 520 has a measuring line 523. The lid 520 comprises four panels 524a, 524b, 524c, and 524d, each of which is connected to each other with substantially right angle. The lid 520 has a vertex 522. Thus, the lid 520 is a cup-shaped container. The lid 520 has a cavity 521 defined at the vertex 522. The cavity 521 is defined on the container space side. The cavity 521 is a hermetically resealable device. As shown in FIG. 2, when the lid 520 is attached to the carton 10 so that the vertex lid 520 of the carton 10 fits to the opening portion 30 of the carton 10, the lid 520 covers the opening portion 30 of the carton 10. At this point, the cavity 521 of the lid 520 comes in contact with edges of carton panels that define the opening portion 30, thereby fixing the lid 520 to the carton 10.

In FIG. 20, the lid 620 has a measuring line 623. The lid 620 comprises four panels 624a, 624b, 624c, and 624d, each of which is connected to each other with substantially fight angle. The lid 620 has a vertex 622. Thus, the lid 620 is a cup-shaped container. The lid 620 has a cavity 621 disposed at the vertex 622. The cavity 621 is a hermetically resealable device. As shown in FIG. 2, when the lid 620 is attached to the carton 10 so that the vertex 622 of the lid 620 fits to the opening portion 30 of the carton 10, the lid 620 covers the opening portion 30 of the carton 10. At this point, the cavity 621 at the vertex comes in contact with edges of carton panels that define the opening portion 30, thereby fixing the lid 620 to the carton 10.

In FIG. 21, the lid 720 has a measuring line 723. The lid 720 comprises four panels 724a, 724b, 724c, and 724d, each of which is connected to each other with substantially fight angle. The lid 720 has a vertex 722. Thus, the lid 720 is a cup-shaped container. The lid 720 has a plug 721 that extends to the container space. The plug 721 is a hermetically resealable device. As shown in FIG. 2, when the lid 720 is attached to the carton 10 so that the vertex 722 of the lid 720 fits to the opening portion 30 of the carton 10, the lid 720 covers the opening portion 30. At this point, the plug 721 comes in contact with edges of carton panels that define the opening portion 30, thereby fixing the lid 720 to the carton 10.

The carton according to the present invention (for example, 10 (FIG. 1), 110 (FIG. 6), 210 (FIG. 8), 310 (FIG. 10), 810 (FIG. 12), 910a (FIG. 13), 910b (FIG. 14), and 910c (FIG. 15)) is preferably fabricated of a cardboard. A preferable cardboard is for example a clay-coated paper. The cardboard for use with the carton according to the present invention may be barrier-coated or laminated with various synthetic resins so that the carton has a moisture resistance.

The carton according to the present invention may selectively have features that conventional cardboard cartons have. For example, at least one horizontal folding line may be ruled on each panel of the carton. Thus, after the contents of the carton have been completely dispensed, the carton can be compactly folded and disposed of In addition, the carton may have a known tear tape.

In a fabrication process, the carton may be filled with a granular substance in the following manner. First, all the panels other than the upper flaps (for example, 12a, 12b, 12c, and 12d of FIG. 5) are folded and fixed. After the carton has been filled with the granular substance from the top of the carton, the upper flaps are folded and fixed.

The lid according to the present invention (for example 20 (FIG. 1), 120 (FIG. 6), 220 (FIG. 8), 320 (FIG. 10), 820 (FIG. 12), 420 (FIG. 16), 520 (FIG. 18), 620 (FIG. 20), and 720 (FIG. 21)) is preferably made of polypropylene, polyethyleneterephthalate, or the like. The lid may be fabricated by a molding method such as injection molding method or thermo-forming method. The lid may be made of another material.

When the lid is made of a cardboard, it may have a moisture resisting property as the carton does.

The lid according to the present invention is constructed of at least three panels connected to each other with substantially right angle. However, the lid is preferably constructed of four panels. Since the panels of the lid are connected to each other with substantially right angle, when the lid is attached to the carton, the contents excessively dispensed in the lid can be easily returned to the carton.

The opening portion of the carton according to the present invention (for example, 30 (FIG. 2), 130 (FIG. 7), 230 (FIG. 9), 330 (FIG. 11), 830 (FIG. 12), 930a (FIG. 13), 930b (FIG. 14), and 930c (FIG. 15)) is formed at least at one of four corners defined by the upper panel, the front panel, the rear panel, and the pair of side panels. Since the opening portion is disposed at such a corner position, when a granular substance is dispensed, the dispensing rate and dispensing amount can be observed and thereby precisely adjusted. It should be noted that according to the present invention the shape of the opening portion is not limited to the shapes shown in the above drawings. In other words, the shape of the opening portion may be modified in various ways as long as the dispensing amount is precisely adjusted. In addition, according to the present invention, the size of the opening portion is not limited as long as the above-mentioned function is not adversely affected.

The hermetically resealable device(s) according to the present invention (for example, 21a, 21b, 21c, and 21d (FIG. 2), 121 (FIG. 7), 221a and 221b (FIG. 9), 321 (FIG. 11), 821 (FIG. 12), 424a and 424d (FIG. 16), 521 (FIG. 18), 621 (FIG. 20), and 721 (FIG. 21)) are pins, clips, a plug, curves of panels, and a cavity of the lid. The lid may have one hermetically resealable device. In addition, the lid may have two or more different/same hermetically resealable devices.

When the lid is normally attached to the carton so that the vertex of the lid fits to the opening portion of the carton, the granular substance storing and dispensing container can be hermetically sealed. On the other hand, the lid can be easily detached from the carton. To prevent the lid of the granular substance storing and dispensing container from being detached from the carton during fabrication process or transportation, a means for fixing the lid to the carton may be provided. As an example of this means, after the vertex of the lid has been fitted to the opening portion of the carton, at least one panel of the carton is adhered to at least one panel of the lid with a tape or a seal.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A detachable lid for a substantially rectangular parallelopiped container, said container having six panels, of which a first set of three panels converges at a first corner and a second set of three panels converges at a second corner, said first set of three panels having two panels in common with said second set of three panels, said first corner having a dispensing opening formed into said first set of three panels, said detachable lid comprising:

a) a handle portion having a first end and a second end, said handle portion also having a longitudinal member and a transverse wall substantially perpendicular to said longitudinal member, said transverse wall located at said first end of said handle portion;

b) a cup-shaped measuring device connected to said second end of said handle portion, said measuring device having three adjoining walls adapted to rest against said first set of three panels of said container to completely cover said dispensing opening when said handle portion is also mounted against said container, said transverse wall of said handle portion resting against said second corner of said container; and c) a plug projecting from each of said three adjoining walls of said measuring device, said plug facing said first corner and shaped to press into said dispensing opening to close said dispensing opening when said detachable lid is mounted to said container.

2. A detachable lid for a substantially rectangular parallelopiped container, said container having six panels, of which a first set of three panels converges at a first corner and a second set of three panels converges at a second corner, said first set of three panels having two panels in common with said second set of three panels, said first corner having a dispensing opening formed into said first set of three panels, said detachable lid comprising:

a) a handle portion having a first end and a second end, said handle portion also having a longitudinal member and a transverse wall substantially perpendicular to said longitudinal member, said transverse wall located at said first end of said handle portion;

b) a cup-shaped measuring device connected to said second end of said handle portion, said measuring device having three adjoining walls adapted to rest against said first set of three panels of said container to completely cover said dispensing opening when said handle portion is also mounted against said container, said transverse wall of said handle portion resting against said second corner of said container; and c) at least two clips projecting from at least two of said three adjoining walls of said measuring device, said at least two clips engaging at least two of said panels of said first set of three panels at said dispensing opening to hold said measuring device against said dispensing opening to close said dispensing opening when said detachable lid is mounted to said container.

3. A detachable lid for a substantially rectangular parallelopiped container, said container having six panels, of which a first set of three panels converges at a first corner and a second set of three panels converges at a second corner, said first set of three panels having two panels in common with said second set of three panels, said first corner having a dispensing opening formed into said first set of three panels, said detachable lid comprising:

a) a handle portion having a first end and a second end, said handle portion also having a longitudinal member and a transverse wall substantially perpendicular to said longitudinal member, said transverse wall located at said first end of said handle portion; and b) a cup-shaped measuring device connected to said second end of said handle portion, said measuring device having three adjoining walls adapted to rest against said first set of three panels of said container to completely cover said dispensing opening when said handle portion is also mounted against said container, said transverse wall of said handle portion and an opposing wall of said measuring device being convexly bowed toward each other to press against said container to hold said detachable lid tightly to said container, while simultaneously closing said dispensing opening.

\* \* \* \* \*

UNITED STATES PATENT AND TRADEMARK OFFICE
CERTIFICATE OF CORRECTION

PATENT NO. : 5,551,629
DATED : September 3, 1996
INVENTOR(S) : Kanna Fujimoto

It is certified that error appears in the above-identified patent and that said Letters Patent is hereby corrected as shown below:

Claim 1,
Lines 23, 25, 27, and 41, please delete "comer" and insert therefore -- corner --.

Claim 2,
Lines 51 and 67, please delete "comer" and insert therefore -- corner --.
Line 58, please delete "wail" and insert therefore -- wall --.

Claim 3,
Lines 10, 12 and 14, please delete "comer" and insert therefore -- corner --.

Signed and Sealed this

Eighteenth Day of December, 2001

Attest:

JAMES E. ROGAN
Attesting Officer   Director of the United States Patent and Trademark Office